United States Patent
Yuan

(10) Patent No.: US 9,160,964 B2
(45) Date of Patent: Oct. 13, 2015

(54) ONLINE TERMINAL

(75) Inventor: Xue Yuan, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 317 days.

(21) Appl. No.: 13/989,114

(22) PCT Filed: May 25, 2011

(86) PCT No.: PCT/CN2011/072181
§ 371 (c)(1),
(2), (4) Date: May 23, 2013

(87) PCT Pub. No.: WO2012/068811
PCT Pub. Date: May 31, 2012

(65) Prior Publication Data
US 2013/0243078 A1    Sep. 19, 2013

(30) Foreign Application Priority Data

Nov. 23, 2010 (CN) .......................... 2010 1 0557365

(51) Int. Cl.
*H04B 1/66* (2006.01)
*H04N 7/12* (2006.01)
(Continued)

(52) U.S. Cl.
CPC ............. *H04N 7/14* (2013.01); *H04M 1/72527* (2013.01); *H04N 7/142* (2013.01); *H04N 21/4122* (2013.01); *H04N 21/41407* (2013.01); *H04W 88/181* (2013.01)

(58) Field of Classification Search
None
See application file for complete search history.

(56) References Cited

U.S. PATENT DOCUMENTS 7,672,591 B2 * 3/2010 Soto et al. ........................ 398/72
8,401,322 B2 * 3/2013 Hamada et al. ................ 382/251
(Continued)

FOREIGN PATENT DOCUMENTS

CN    1980132 A    6/2007
CN    1988614 A    6/2007
(Continued)

OTHER PUBLICATIONS

English Translation of the Written Opinion of the International Searching Authority for International Application No. PCT/CN2011/072181 mailed Sep. 8, 2011, 3 pages.
(Continued)

*Primary Examiner* — Joseph Ustaris
*Assistant Examiner* — Talha Nawaz
(74) *Attorney, Agent, or Firm* — Lando & Anastasi, LLP

(57) ABSTRACT

The present disclosure discloses an online terminal comprising a wireless signal transceiver unit, a wireless signal codec unit, an audio format conversion circuit, an encoding display conversion circuit, a conversion control circuit, a man-machine interface, an audio interface, and a display interface; the wireless signal transceiver unit is configured to receive and transmit a wireless signal; the wireless signal codec unit is configured to decode the wireless signal received by the wireless signal transceiver unit, encode the wireless signal to be transmitted and modulate the encoded wireless signal into the wireless signal; the audio format conversion circuit is configured to convert an audio format supported by the online terminal to an audio format supported by a television; the encoding display conversion circuit is configured to convert an video format supported by the online terminal to an video format supported by the television; the conversion control circuit is configured to implement the switching between a television signal and the output signal of the online terminal. The online terminal provided by the present disclosure is inexpensive and has powerful online function.

9 Claims, 1 Drawing Sheet

(51) Int. Cl.
*H04N 11/02* (2006.01)
*H04N 11/04* (2006.01)
*H04N 7/14* (2006.01)
*H04W 88/18* (2009.01)
*H04M 1/725* (2006.01)
*H04N 21/41* (2011.01)
*H04N 21/414* (2011.01)

(56) References Cited

U.S. PATENT DOCUMENTS

| | | | | |
|---|---|---|---|---|
| 8,543,008 B2 * | 9/2013 | Soto et al. | ...................... | 398/171 |
| 8,839,341 B1 * | 9/2014 | Nee | .............................. | 725/149 |
| 8,938,674 B2 * | 1/2015 | Adolph et al. | ................. | 715/716 |
| 8,976,670 B2 * | 3/2015 | Meier et al. | ................... | 370/237 |

FOREIGN PATENT DOCUMENTS

| CN | 201035360 Y | 3/2008 |
|---|---|---|
| CN | 201430663 Y | 3/2010 |
| KR | 20050012881 A | 2/2005 |

OTHER PUBLICATIONS

International Search Report for International Application No. PCT/CN2011/072181 mailed Sep. 8, 2011, 4 pages.

* cited by examiner

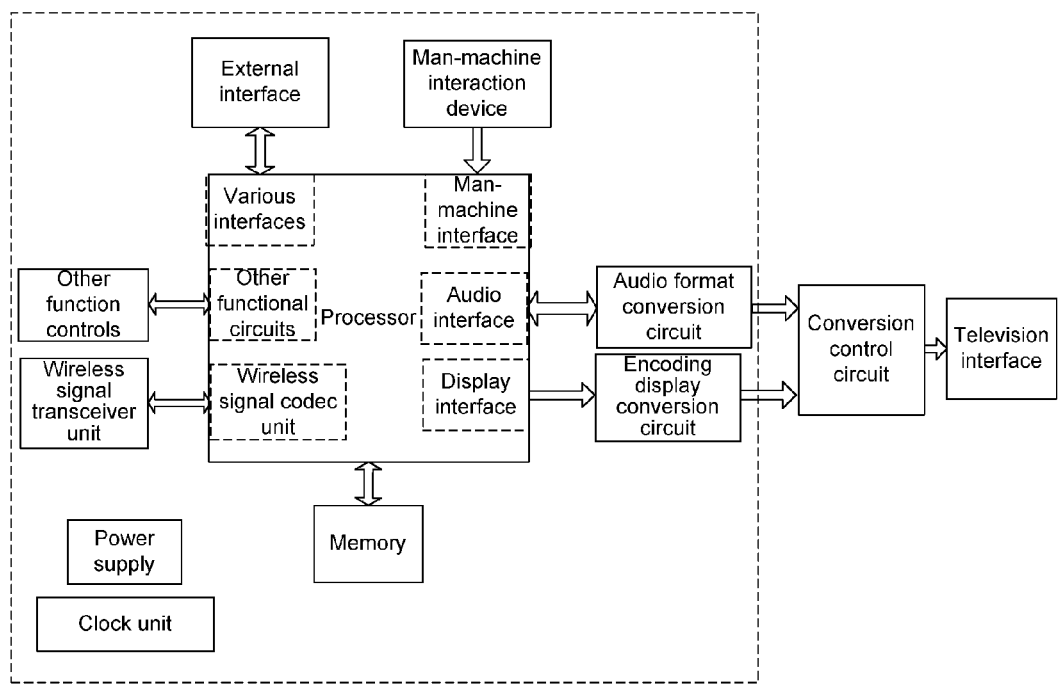

ONLINE TERMINAL

TECHNICAL FIELD

The present disclosure relates to an online terminal and more particularly to an inexpensive online terminal.

BACKGROUND

With the development of technologies, surfing gradually becomes indispensable in our life. Presently, most people enjoy surfing with a desktop computer, a notebook, an online book or a handset. However, those manners have their own limitations, for example, it is relatively expensive to purchase a computer/Netbook, and a handset, although inexpensive, is small in screen, low in internet speed and poor in user experience.

The reason lies in that existing online terminals mainly consist of a display screen, which is expensive, especially when the display screen is a liquid crystal screen or a large-sized one, and a host having a data processing function.

A low-cost online terminal capable of providing an excellent experience effect has been pursued for a long time. However, the online terminals currently available on the market are limited to basic terminals including computers, handsets and onlinebooks, and no other online terminal except for the traditional products is available.

SUMMARY

In view of the problem above, the main object of the present disclosure is to provide an online terminal which can implement the output of an audio or a video by means of a household television to achieve an online service at a low cost and is therefore easy to be popularized.

In order to achieve the purpose above, the technical scheme of the present disclosure is realized as follows:

An online terminal comprises: a wireless signal transceiver unit, a wireless signal codec unit, an audio format conversion circuit, an encoding display conversion circuit, a conversion control circuit, a man-machine interface, an audio interface, a display interface and a television interface, wherein the wireless signal transceiver unit is configured to receive and transmit a wireless signal;

the wireless signal codec unit is configured to decode the wireless signal received by the wireless signal transceiver unit, encode the wireless signal to be transmitted and modulate the encoded wireless signal into the wireless signal;

the audio format conversion circuit is configured to convert an audio format supported by the online terminal to an audio format supported by a television;

the encoding display conversion circuit is configured to convert an video format supported by the online terminal to an video format supported by the television;

the conversion control circuit is configured to control the audio format conversion circuit and the encoding display conversion circuit to realize the conversion of audios and videos and the switching between a television signal and the output signal of the online terminal;

the wireless signal transceiver unit is connected with the wireless signal codec unit, the audio format conversion circuit is connected with the audio interface, the encoding display conversion circuit is connected with the display interface, the audio format conversion circuit and the encoding display conversion circuit are connected with the conversion control circuit, the conversion control circuit is connected with the television interface, and the television interface is connected with the audio interface and the video interface of the television.

Preferably, the wireless signal transceiver unit is configured to receive and transmit at least one of a 2nd Generation (2G) wireless signal, a 3rd Generation (3G) wireless signal, a Wireless Fidelity (WIFI) wireless signal, a Worldwide Interoperability for Microwave Access (WiMax) wireless signal, a Bluetooth (BT) wireless signal and a Radio Frequency Identification (RFID) wireless signal.

Preferably, the wireless signal codec unit is configured to encode and decode the data of at least one of a short message service, a voice call and a packet data service.

Preferably, the display interface includes a three-primary color (Red Green Blue) RGB interface, a CPU interface (also called MPU interface) and a Mobile Display Digital Interface MDDI, wherein the television interface includes an audio interface and a video interface which are respectively connected with the audio interface and the video interface on the television; the audio interface and the video interface of the television interface are respectively connected with the audio interface and the video interface arranged on the television to transmit the audio data and video data in the online terminal to the audio interface and the video interface on the television; and the video interface of the television interface includes a Composite Video Broadcast Signal (CVBS) interface, a Video Graphic Array (VGA) interface and a High-Definition Multimedia Interface (HDMI).

Preferably, the encoding display conversion circuit is configured to convert the video format supported by the display interface to the video format supported by the television interface.

Preferably, the man-machine interaction device includes a keyboard and/or a mouse and/or a touch screen.

Preferably, the terminal further comprises: a clock unit configured to provide a clock signal for the wireless signal transceiver unit, the wireless signal codec unit, the man-machine interaction device, the audio format conversion circuit, the encoding display conversion circuit, the conversion control circuit, the man-machine interface, the audio interface, the display interface, the television interface and the operating system of the online terminal.

Preferably, the terminal further comprises an external interface connected with a peripheral device.

Preferably, the external interface includes a USB interface, an SIM card interface and a T/SD card interface.

In the present disclosure, an online terminal dedicated for internet access at home is set to achieve the online effect of an expensive device such as a computer/notebook computer at a low cost as well as an SIM function and a call function, which makes it possible to enjoy a high-quality online experience at a low cost, consequentially, it is easy for the user to use the online terminal, and the user experience effect is improved. A switching between a television and the online terminal can be conveniently implemented by the conversion control circuit arranged externally. As provided with no display device such a display screen, the cost of the online terminal provided herein significantly reduced. Moreover, the designer can focus on the online processing function of the online terminal so that the online function of the online terminal is more outstanding.

BRIEF DESCRIPTION OF THE DRAWINGS

FIG. 1 is a schematic diagram illustrating the structure of the online terminal provided in the present disclosure.

DETAILED DESCRIPTION

In order to provide a better understanding of the objects, the technical scheme and the advantages of the present disclosure, the present disclosure is described below in detail with reference to embodiments in conjunction with accompanying drawings.

FIG. 1 is a schematic diagram showing the structure of the online terminal provided in the present disclosure, as shown in FIG. 1, the online terminal provided herein consists of: a power supply manager, a clock, a processor, a wireless transceiver unit, a memory, an encoding display conversion circuit, an audio format conversion circuit, a conversion control circuit, an interaction device, an external interface (e.g. Universal Serial Bus (USB), an audio, a Subscriber Identity Module (SIM) card and T/SD card interface) and other functional circuits. The functions of each of the members above are illustrated in detail below.

The processor is the core of the online terminal, and includes a wireless signal codec unit. The man-machine interface, the audio interface and the display interface are all connected with the processor. The processor provided herein demodulates, decodes and deciphers the wireless signal received by the wireless transceiver unit, calls and runs the program stored in the memory to process the digital signal in the processor, controls each functional module using a General Purpose Input Output (GPIO) interface to achieve corresponding functions, and provides various interfaces to achieve a connection and/or interaction with the outside. Apparently, when there is data to be sent, the processor encrypts and encodes the data to be sent, then modulates the encoded data to a corresponding signal to be transmitted and sends the signal wirelessly using the wireless transceiver unit.

The wireless transceiver unit is connected with the wireless signal codec unit of the processor, so as to transmit a wireless signal by performing source/channel coding and source/channel decoding, encrypting, amplifying and filtering on a signal. The wireless transceiver unit may be a wireless antenna. That is, the online terminal provided herein realizes an online function mainly in a wireless manner. The wireless transceiver unit is configured to receive and transmit at least one of a 2nd Generation (2G) wireless signal, a 3rd Generation (3G) wireless signal, a Wireless Fidelity (WIFI) wireless signal, a Worldwide Interoperability for Microwave Access (WiMax) wireless signal, a Bluetooth (BT) wireless signal and a Radio Frequency Identification (RFID) wireless signal. The online terminal provided herein can also realize a call service and a message function. That is, the online terminal can achieve the functions of a handset at this time. In other words, in addition to the basic functions of a handset, the online terminal provided herein also provides an online function when used in combination with a household television, thus, the online terminal can achieve a multiple-function-in-one-machine effect.

The memory provided by the present disclosure is connected with the bus of the processor, to store the codes run by the system and the information and programs stored by the user. The memory may be an RAM, an ROM and a flash memory.

The encoding display conversion circuit is connected with the display interface of the processor and cooperates with the operating software and timing sequence of the online terminal to encode and covert the digital display signal input by the processor to a television interface signal and then outputs the obtained television interface signal. The encoding display conversion circuit is necessary as the display format of most televisions is different from that of the processor. Generally, the format supported by the processor is a three-primary color Red Green Blue (RGB) interface, a CPU interface, an MDDI interface and the like, while the display format supported by a television is a CVBS interface, a VGA interface, an HDMI and other encoded videos. The encoding display conversion circuit first identifies the display video data output by the processor and then converts the display video data according to the display format of the connected television.

The television interface includes the audio interface and the video interface connected with the audio interface and the display interface of the online terminal provided herein, the audio interface and the video interface of the television interface are also connected with the audio interface and the video interface arranged on the television so that the audio data and video data in the online terminal are transmitted to the audio interface and the video interface on the television, and then the television outputs an audio and video. The display interface of the online terminal includes a three-primary color RGB interface, a CPU interface (also called MPU interface) and an Mobile Display Digital Interface MDDI interface, and the video interface of the television interface includes a Composite Video Broadcast Signal CVBS interface, a Video Graphics Array VGA interface and an High Definition Multimedia Interface HDMI.

The audio format conversion circuit is connected with the audio interface of the processor to convert the audio format supported by the processor to the audio format supported by the television. Similar to the encoding display conversion circuit, the audio format conversion circuit is needed as it is required to convert the audio format of the processor to a left/right channel format since the audio formats of the television and the processor are different. It should be appreciated by those skilled in the art that the identification of a corresponding video format and the conversion of the identified video to video data of another corresponding format can be implemented by a piece of corresponding video data conversion software or a corresponding video data conversion circuit, and therefore the detail of the conversion of video data is not described repeatedly here.

The interaction device, which includes a keyboard and/or mouse, a sensor and a touch screen, is connected with the man-machine interface of the processor to achieve a man-machine interaction. Certainly, the man-machine interaction may also be achieved wirelessly, for example, by a sensor or by human eye rotation recognition. The present disclosure is not limited to a specific man-machine interaction mode.

The external interface, which is, for example, an SIM card interface, a T/SD card interface and a USB interface, is connected with various interfaces of the processor to realize corresponding functions of the various interfaces. The SIM card mainly achieves two functions: data storage (the control over and the access to various data) and a whole customer identity authentication and customer information encryption algorithm process under a secure condition (personal identify number (PIN) and authentication key Ki are correct). The T/SD card is configured to store multimedia information. The USB interface is connected with a USB device to transmit a USB protocol.

Other functional circuits are connected with control pins of the processor to realize other functions except for online and SIM functions as needed. For example, a cooperative Frequency Modulation (FM) circuit can realize an FM/radio function, and other functions, such as sound recorder, BT, and WiFi and Global Positioning System (GPS) can also be realized.

The conversion control circuit is connected with the audio interface and the display interface and the television interface of the online terminal to switch, on the display screen of the television, between a television signal and an online interface conveniently by controlling the conversion circuit. The conversion control circuit may be integrated in the online terminal or produced as an independent module plate which is used in combination with the online terminal provided herein, the conversion control circuit of the present disclosure is not limited to a specific realization mode as long as the conversion control circuit is capable of implementing a corresponding audio/video conversion.

The online terminal provided herein further comprises a power supply and a clock unit. The power supply manager supplies power for the processing unit of the whole online terminal and implements a charging management. The clock unit provides a reference frequency to provide a clock signal for the processing unit and the operating system of the online terminal.

The online terminal provided herein realizes online and SIM functions substantially in the following way:

after the wireless transceiver unit receives a wireless signal, the processor demodulates the received wireless signal, the processor processes the demodulated signal, the signal required to be displayed is input to the encoding display conversion circuit through the display interface, and an audio signal is input to the audio conversation circuit through the audio interface. The encoding display conversion circuit cooperates with a software and the timing sequence of the clock to perform a TV/VGA encoding on the input digital signal, the audio conversion circuit converts an audio to a format supported by the television and then outputs the converted format to the conversion control circuit, which is connected with the television interface to display the content of a website and a message on the television and to broadcast a related audio. The user interacts (refer mainly here to the control over the online terminal, such as the selection on a menu or website, the opening and closing of a website and the browse of and response to an SIM) with the operating system of the online terminal through the interaction device (e.g. a keyboard and/or mouse, sensor), the processor responds to the interruption of the interaction device (e.g. a keyboard and/or mouse, sensor) to process related information, update the information displayed, and broadcast related audio. The digital signal to be sent is encoded and the transmitted by the wireless transceiver unit.

The online terminal provided herein can realize online and message functions with a television/liquid crystal display and a switching between the online terminal and the television can be conveniently conducted, and therefore existing resources are fully made use of. In the present disclosure, the common display interface (e.g. three-primary color RGB interface, CPU interface, MDDI) format of a handset is converted to the display interface (e.g. CVBS interface, VGA interface and HDMI) of a television/liquid crystal display through the format conversion circuit so that the audio format of the handset is converted to an audio signal that can be displayed on the television, and by using the conversion control circuit, the switching between the television and the online terminal can be controlled easily.

The mentioned above is merely preferred embodiments of the present disclosure but not limitation to the protection scope of the present disclosure.

The invention claimed is:

1. An online terminal, comprising: a wireless signal transceiver unit, a wireless signal codec unit, an audio format conversion circuit, an encoding display conversion circuit, a conversion control circuit, a man-machine interface, an audio interface, a display interface and a television interface;

the wireless signal transceiver unit is configured to receive and transmit a wireless signal;

the wireless signal codec unit is configured to decode the wireless signal received by the wireless signal transceiver unit, encode the wireless signal to be transmitted and modulate the encoded wireless signal into the wireless signal;

the audio format conversion circuit is configured to convert an audio format supported by the online terminal to an audio format supported by a television;

the encoding display conversion circuit is configured to convert an video format supported by the online terminal to an video format supported by the television;

the conversion control circuit is configured to control the audio format conversion circuit and the encoding display conversion circuit to realize the conversion of audios and videos, and implement the switching between a television signal and the output signal of the online terminal;

the wireless signal transceiver unit is connected with the wireless signal codec unit, the audio format conversion circuit is connected with the audio interface, the encoding display conversion circuit is connected with the display interface, the audio format conversion circuit and the encoding display conversion circuit are connected with the conversion control circuit, the conversion control circuit is connected with the television interface, and the television interface is connected with the audio interface and the video interface of the television.

2. The online terminal according to claim 1, wherein the wireless signal transceiver unit is configured to receive and transmit at least one of: a second generation (2G) wireless signal, a third generation 3G wireless signal, a wireless fidelity (WIFI) wireless signal, a Worldwide Interoperability for Microwave Access (WiMax) wireless signal, a Bluetooth (BT) wireless signal and a radio frequency identification (RFID) wireless signal.

3. The online terminal according to claim 1, wherein the wireless signal codec unit is configured to encode and decode the data of at least one of a short message service, a voice call service and a packet data service.

4. The online terminal according to claim 1, wherein the display interface comprises a three-primary color RGB interface, a CPU interface and a mobile display digital MDDI interface; the television interface comprises an audio interface and a video interface which are respectively connected with the audio interface and the video interface on the television; the audio interface and the video interface of the television interface are respectively connected with an audio interface and a video interface arranged on the television to transmit the audio data and video data in the online terminal to the audio interface and the video interface on the television; and the video interface of the television interface comprises a composite video broadcast signal CVBS interface, a video graphic array VGA interface and a high-definition multimedia interface HDMI interface.

5. The online terminal according to claim 4, wherein the encoding display conversion circuit is configured to convert the video format supported by the display interface to the video format supported by the television interface.

6. The online terminal according to claim 1, wherein the man-machine interaction device includes a keyboard, and/or a mouse and/or a touch screen.

7. The online terminal according to claim 1, further comprising: a clock unit configured to provide a clock signal for the wireless signal transceiver unit, the wireless signal codec unit, the man-machine interaction device, the audio format conversion circuit, the encoding display conversion circuit, the conversion control circuit, the man-machine interface, the audio interface, the display interface, the television interface and the operating system of the online terminal.

8. The online terminal according to claim 1, further comprising: an external interface connected with a peripheral device.

9. The online terminal according to claim 8, wherein the external interface comprises a USB interface, a subscriber identity module (SIM) interface and a T/SD card interface.

* * * * *